United States Patent [19]
Ecker et al.

[11] Patent Number: 5,398,804
[45] Date of Patent: Mar. 21, 1995

[54] CURVED CONVEYOR BELT WITH SUPPORTING FRAME DEVOID OF BELT BAND ROLLERS

[75] Inventors: Robert Ecker, Vettweiss; Johannes Lintermann, Aachen; Friedhelm Buderath, Euskirchen, all of Germany

[73] Assignee: E+PK Ingenieurbüro für Entwicklung und Planung, Zulpich, Germany

[21] Appl. No.: 190,483

[22] Filed: Feb. 2, 1994

[30] Foreign Application Priority Data

Feb. 15, 1993 [DE] Germany .................. 43 04 402.2
Jul. 10, 1993 [DE] Germany .................. 43 23 127.6

[51] Int. Cl.⁶ ............................................. B65G 35/00
[52] U.S. Cl. .................................. 198/619; 198/805; 198/818; 198/845
[58] Field of Search ............... 198/619, 845, 805, 818, 198/681; 104/292, 293

[56] References Cited

U.S. PATENT DOCUMENTS

| | | | |
|---|---|---|---|
| 2,656,035 | 10/1953 | Thomson et al. | 198/818 |
| 2,838,164 | 6/1958 | Duncan | 198/845 |
| 4,792,036 | 12/1988 | Heidelberg | 198/805 X |

FOREIGN PATENT DOCUMENTS

| | | | |
|---|---|---|---|
| 893022 | 10/1953 | Germany | 198/845 |
| 1075528 | 7/1967 | United Kingdom | 198/845 |

*Primary Examiner*—Cheryl L. Gastineau
*Attorney, Agent, or Firm*—James Creighton Wray

[57] ABSTRACT

A curved belt conveyor, to be used mostly above ground and operating with any desired length, can be operated advantageously without belt band rollers so that no tumbling action can take effect upon the belt band. This makes for long service life, as well as quieter, more uniform and safer operation. Drive is accomplished either via a linear motor drive system acting laterally upon the belt band, said system consisting of magnets arranged on the running wheel carriers and the stators that are firmly integrated into the guide ducts, or where, in the guide ducts, for example, a traction chain runs that is connected correspondingly with the running wheel carriers. The side edges of the belt band are grasped via the running wheel carriers and are so connected with them that one can achieve a swing-motion connection. The belt has a predetermined troughing due to the arrangement of the guide ducts, and that troughing can thus also be altered in accordance with the requirements by changing the arrangement of the guide ducts until it forms practically a closed tube.

17 Claims, 4 Drawing Sheets

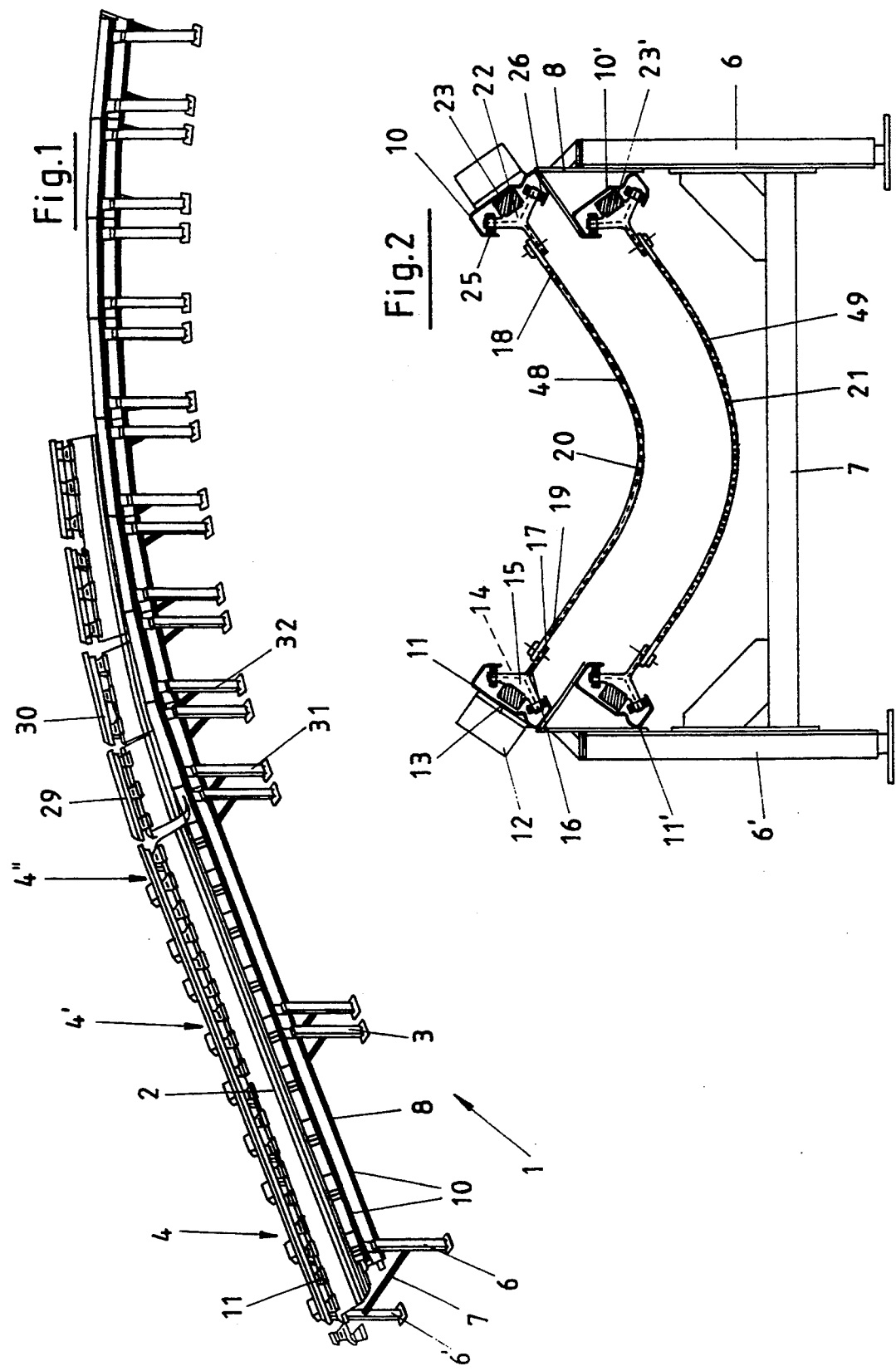

CURVED CONVEYOR BELT WITH SUPPORTING FRAME DEVOID OF BELT BAND ROLLERS

BACKGROUND OF THE INVENTION

This invention relates to a conveyor belt with an endless or mechanically connected belt band that is guided in a supporting frame around terminally arranged deflection rollers and that has a linear motor system—arranged along the belt band—with stators and magnets that are associated with the belt band.

Such conveyor belts are used above all in underground mine and tunnel construction to transport coal and rocks or ore. They are also used above-ground to convey the most varied materials. These conveyor belts cover considerable distances, although the length of these conveyor systems, in underground mining, will depend on the layout of the roads. For example, if the latter run along a curve or if they are bent at a right angle or some other angle, then transfer devices must be set up at these points and that, to some extent, also entails rather considerable installation and above all attendance efforts. Furthermore, the motors used here represent a limitation in which connection—by including intermediate drives (ZE "Hebezeuge und Förder- mittel" 18, 1978 pages 76-80)—an attempt was made to increase the length of the belt conveyors and at the same time also to reduce the stress on that belt band. But it was found that such intermediate drives are not suitable because the necessary friction value between the two belts is not adequately assured. Furthermore, decentrally placed drives have been used in the form of linear motors with the permanent magnets being inserted into the edges of the belt band cover while the electromagnets—then grasping around the edges of the belt band and lying in stators—were driven in the form of a linear motor drive. The experiments were discontinued because, first of all, the forces acting upon the two edges of the belt band were not uniform and, besides, because the stators were slightly damaged by the conveyor belt. Moreover, dust settles in the gap between stator and conveyor belt so that there is no longer any necessary magnetic force flux.

DE-OS 37 41 054 reveals conveyor belts with linear drives, where the permanent magnets are integrated into a guide bar placed upon the underside of the belt band. The stators are arranged laterally and so as to act upon the permanent magnets, next to the drive or guide bar. In addition to these drives, there are also provided lifting devices in the form of permanent magnets and stators, whereby the permanent magnets are housed in the edges of the conveyor belt and the stators are provided perpendicularly on top. These linear motors are used to try to lift the belt so that the carrying rollers actually only perform guidance functions because the belt practically floats on the magnetic force cushion. The conveyor belt, with integrated permanent magnets, must be guided at the end of the belt band conveyor around deflection rollers; this naturally generates stress and tumbling processes that severely impair these parts of the linear motor drive. The lifting of the belt is not adequate either so that—especially in the middle, where the conveyor belt is loaded by the material to be conveyed—powerful tumbling work is again generated on the belt band rollers so that such a belt or such a belt band will reveal a heavily restricted service life. The guide bar and drive bar, attached on the underside, can also create a problem because, along the deflection rollers, these parts are also subjected to heavy stress even in case of divided deflection rollers. Another disadvantage has to do with the relatively high price for the equipment of belt bands with such guide bars and the danger that the guide bar might be separated from the belt. On the other hand, of course, it is advantageous that these guide bars create the possibility of guiding such bands around curves so that considerably larger conveyor belt lengths can thus be achieved.

The task of the invention is to create a belt conveyor that is to be guided around curves also having a tight radius and whose belt band is kept clear and free of the disadvantageous tumbling work of carrying rollers and to ensure a long service life.

SUMMARY OF THE INVENTION

The problem is solved according to the invention in that the supporting frame reveals guide ducts that run bilaterally in the longitudinal direction and to delimitate the belt band on the reverse side of these ducts, facing away from the belt band, the stators are arranged at an interval and reveal a recess that passes through longitudinally toward the belt band and that is intended for a carrying spar of a guide device, whereby the carrying spar is connected with the side edge of the upper belt or lower belt and is so fashioned as to receive magnets that are arranged opposite the stators.

The belt band of such a conveyor belt hangs freely between the guide ducts; the guide device must see to it that smooth running and guidance will be ensured. By means of the distance of the individual guide ducts on the two sides of the supporting frame, one can predetermine the trough of the belt band, and one can also maintain it exactly. In this way it is possible to guide the two belt bands, that is to say, the upper belt and the lower belt, relatively closely to each other and that advantageously permits a low structural height of the entire construction. It is even possible to arrange the two opposite guide ducts so tightly next to each other that the belt will practically form a closed tube that can be guided excellently around curves due to the large trough. Because this considerably reduces the compression and stretching of the belt band cover. It is furthermore possible that—because of the missing carrying rollers—a belt in the upper and lower segment, depending on space conditions, can also be stretched in a lateral position so that there will be no trough at all. It is advantageous that such a conveyor belt no longer requires any belt band rollers, so that the belt band, as mentioned earlier, is guided in a freely suspended fashion and is kept clear of any tumbling work, if one overlooks the fact that the belt band must be guided around deflection rollers where, however, relatively minor forces are at work because the rollers merely have guidance functions and no drive functions. The power instead is transmitted via the linear motor drive system, and the latter is adapted to the intended purpose in a particularly clever and optimized fashion. The stators are associated with the supporting frame, specifically, in such a fashion that they do not represent any hindrance and can easily be supplied with the necessary energy. On account of their arrangement on the reverse side of the particular guide ducts, the force flux between them and the magnet can always be ensured so that the necessary drive forces will be reliably provided. As a rule, the belt is suspended between the individual linear motor drive parts on both sides of the supporting frame, and therefore there need not develop any disadvantageous friction stress, and thus energy destruction. Such a conveyor belt can be used advantageously above all also in underground operations where one can run through large and uniform curves without problems and in a smooth fashion, and where the low structural height also has an advantageous effect.

According to a practical feature, it is provided that the guide device be fashioned as a T-shaped running wheel carrier that forms the end opposite the carrying spar and that reveals crossbars to receive the magnets. Such a design advantageously makes for small friction stress due to the shaping of the running wheels associated with the running wheel carriers and, beyond that, makes it possible, by correspondingly shaping the guide ducts and also the carrying spars, to adjust and ensure the degree of trough each time.

According to another practical feature of the invention, it is provided that the belt band is to be equipped with lateral reinforcements. Because one can completely dispense with longitudinal reinforcements, one can also thus considerably simplify the structure of the belt band, and at the same time, one can make it in a reasonably priced fashion. The lateral reinforcements see to it that—even in case of stress derived from the material to be conveyed—the belt band will not trough too much, but instead will be made in a manner evenly shaped over the entire length, thus ensuring optimum conveyance.

Here it is practical that the lateral reinforcements be integrated in the belt band at an interval corresponding to the interval between the carrying spars; this makes for adequate lateral reinforcement without complicating the structure of the belt band too much.

According to the invention, one can even dispense with the integration of the lateral reinforcements whenever the lateral reinforcements are made as connecting belts between running wheels or carrying spars arranged opposite each other and connected with the underside of the upper belt and the top side of the under belt. The particular lateral reinforcements or connecting belts thus carry the belt band as such which is then made in a definitely simple structural fashion because, after all, it need carry only the load of the material being conveyed, while the stiffening or reinforcement take place via the connecting belts.

A simple and practical way to make the supporting frame is to fashion it in a H-shaped manner and to arrange the guide ducts on the upper end of the perpendicular supports. Here, the guide ducts for the upper belt and the lower belt are placed relatively closely to each other, or it is even possible to determine them as being one structural unit, especially since both of them have the same shape. The carrying frame itself has a simple structure and can absorb the necessary loads without problems whereby the guide ducts simultaneously represent the longitudinal connections of the parts that are made H-shaped.

The trough that is customary in the case of known conveyor belts can be set and maintained according to the invention if the guide ducts are arranged at an angle with respect to the supporting frame, whereby an angular position of 0°-90° is possible. Depending on the position of the guide ducts, one can transport large quantities of material to be conveyed. Depending on the situation, it may also be practical to have the supporting frame reveal obliquely positioned spars on which the guide ducts are attached at a right angle to the belt band.

According to the invention, the side edges of the belt band can be guided without problem in that the flanges of the guide ducts—that serve as running surfaces for the wheels of the running wheel carriers—and the sections of the crossbars are positioned correspondingly obliquely. There can be no jamming or oblique positioning of the wheels or their associated carts. Such a stress due to friction forces is extensively minimized, particularly when running through the curves so that there is no impairment here. According to the invention, it is provided that the guide ducts are made so as to result in a curved duct, bent so as to correspond to the desired or necessary curve radius. Here, of course, it is disadvantageous that a certain shape of the guide ducts and the supporting frame are required for the anticipated curve, and they as a rule cannot then be used for other purposes but, in that case, one can ensure a uniform and quiet run of the device or of the belt band also in the area of the curves. On the other hand, it must be kept in mind that the curves—especially in underground operations—as a rule are approximately standardized so that the guide ducts, bent in this fashion, can also be reused for similar purposes. It is, however, also conceivable that the guide ducts may be assembled from short duct segments and, resulting in a predetermined curve, can be connected directly with each other or via the supporting frame, whereby the length of the guide ducts and the carrying frames must be reduced or increased, depending on the curve radius. There may be minor stress here at the transition from one guide duct to the other; but that can be reduced by the type of wheels or running wheel carriers so that one need not expect any noteworthy impairment here either.

One gets a favorable design of the running wheel carrier and a favorable association of the magnet when the running wheel carriers reveal a crossbar that consists of sections that are placed toward each other in a V-shaped manner and that is equipped in the middle with a mounting for the magnet. By fashioning the running wheel carrier or the crossbar in this way, one can arrange the magnet in a favorable manner; after all, the magnet is to work in a manner corresponding to the stators arranged on the reverse side of the guide ducts and, by virtue of this shape, always assumes the same position. Furthermore, the wheels, when going into action, are guided uniformly and reliably and find the necessary running surface. Along with the desired shaping and arrangement of the magnets on the crossbar, it is also possible to have the magnet arranged standing edgewise on a narrow side and extending between two stators. That provides particularly large effect surfaces, something that is advantageous, particularly when dealing with longer conveyor belts, or when the individual linear motor drive systems are at somewhat greater intervals.

To ensure the derailing or a specifically established uniform guidance of the wheels, the invention provides that the reverse side of the guide ducts reveal a groove, protruding toward the inside, above one of the wheels. In this way, one can favorably intercept the moments, and this facilitates flexible line layout. The wheel would be guided reliably, even when tilting, so that the magnet is not forced against the reverse side or breaks off or so that the drive forces, necessary on account of the oblique position, cannot be transmitted.

An overloading of the edges of the belt band and, simultaneously, a reliable guidance and fixation are ensured according to the invention in that the free end of the carrying spar is connected in an articulated fashion with the side edge of the belt band. In that way, the belt band is not overloaded, regardless of the particular stress in the marginal area; instead, the side edge can be bent off somewhat with respect to the carrying spar without any impairment or overloading. At the same, one can thus also rule out the overloading of the carrying spar or the entire running wheel carrier. To attain this articulated connection, the invention provides that the belt band is connected in an articulated fashion via a clamping device with the carrying spar; this clamping device reveals a length that corresponds to each carrying spar so that one can rule out any point stresses on the belt or its side edge. The force instead is introduced via a corresponding length so that the fixations ensure long service life.

A connection that is reliable and that at the same time provides optimum articulation is a connection where the clamping device and the carrying spar reveal teeth that engage each other in hinge-fashion, through which is guided a swing access running laterally, and thus parallel to the side edge. This design furthermore offers the advantage that it is quite stable and insensitive to dust and dirt; this offers considerable advantages especially during bulk goods transport. The continuing mobility in this hinge joint would again and again remove any possibly developing contaminations, so that a self-cleaning hinge connection is thus provided, so to speak.

In place of the linear motor drive variant, it is also possible according to the invention to have another variant where, specifically, the drive system, associated with the edge of the belt, is characterized in that the supporting frame reveals guide ducts running bilaterally in the longitudinal direction and delimitating the belt band, in which runs a traction chain as drive system, which are open toward the belt band and which are connected with the side edge of the upper belt and the lower belt via a carrying spar. Here, the traction forces are essentially associated with the traction chain, or also a cable, or a similar traction subassembly which reliably transmits them on the basis of the articulated connection with the side edge of the upper belt and the lower belt, whereby in particular also the traction chain can be provided with bribes that are used in underground mining operations, for example, in planing operations. The traction chain, moreover, offers the advantage that the individual links are also connected with each other in an articulated fashion, whereby the guide ducts here have the job of guiding the traction chain, first of all, and then acting as protection, because these guide ducts, after all, can be closed all around, with the exception of the slit that permits the exit of the carrying spar or of the connecting part with the side edge of the belt.

The quiet run of the traction chain, and thus of the entire conveyor, is ensured particularly in that the traction chain is positioned in carts that reveal wheels that roll off in the guide ducts, preferably along their flanks.

The invention is particularly distinguished by the fact that a curved conveyor belt is created which can be used, without any harmful stress due to belt band rollers, also over great lengths, whereby advantageously one can also do without the longitudinal reinforcements in the belt band. In that way, the structure is simple and the linear motor drive system used is practically friction-free; this permits very extensive use, particularly in underground operations. It is furthermore advantageous that one uses a comparatively simply structured supporting frame which, in the case of corresponding shape or design, makes it possible to run through relative tight curves. Furthermore, accessory devices are not required on the belt band itself. Instead, guidance around curves is accomplished with the running wheel carriers needed for the drive system or the linear motor drive system. The running wheel carriers used here ensure an always identical interval between stator and magnet so that such a linear motor drive system is also fully effective. The belt band is guided in a troughing fashion by the guide ducts and the running wheel carriers so that it can transport optimum material quantities. It is furthermore advantageous that there is no need for any cleaning because there can be no soiling of the material to be conveyed, especially on the underside, because here, after all, the previously customary supporting rollers are omitted. This alone reduces the otherwise rather high maintenance effort whereby, as mentioned before, it is possible, particularly also in the case of the under belt, to stretch the belt on the basis of the space conditions in a lateral position or to make a trough in tighter curves so that one practically gets a closed pipeline. The advantages to be achieved with the invention are enormous.

Further details and advantages of the object of the invention will result from the following description of the pertinent drawing, illustrating a preferred practical example with the necessary details and individual parts.

BRIEF DESCRIPTION OF THE DRAWINGS

FIG. 1 is a perspective rendition of the curved conveyor belt;

FIG. 2 is a head-on view of the supporting frame with the belt band;

DETAILED DESCRIPTION OF THE DRAWINGS

Figure 3:
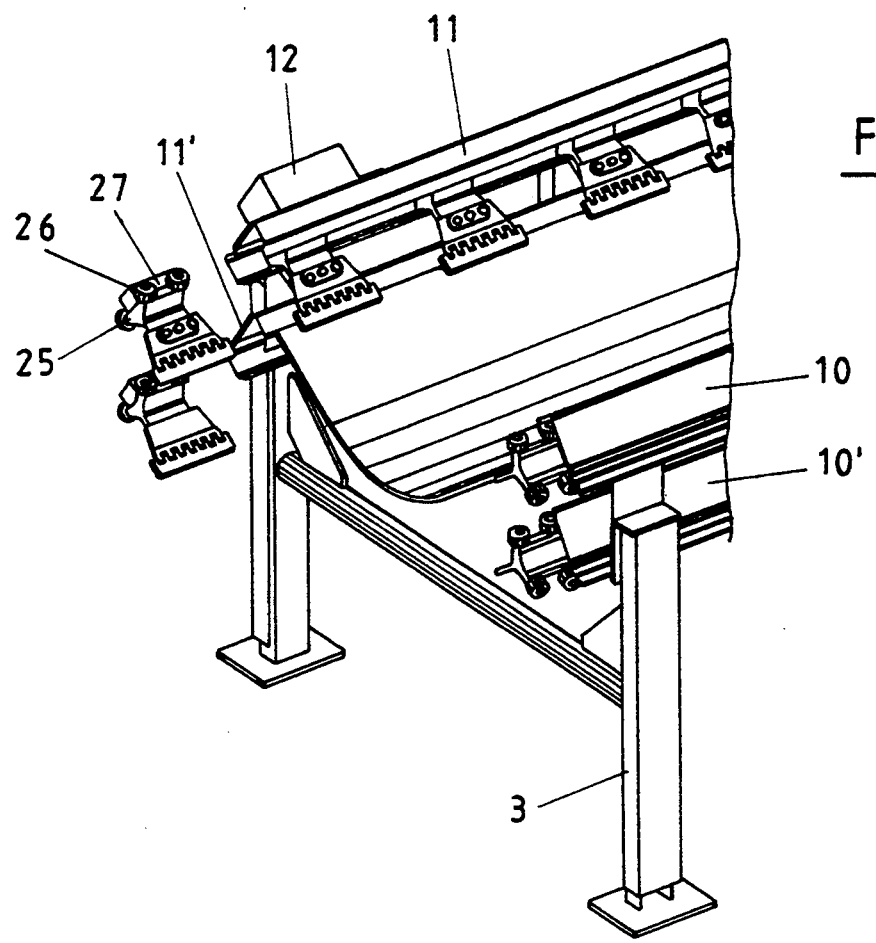
FIG. 3 is a perspective view of the illustration according to FIG. 2.

FIG. 1 shows a perspectively illustrated curved conveyor belt 1 whose belt band 2 is guided in supporting frame 3 around the curve, which is only sketched here, without the development of what is known as a flip arc, where belt band 2 tries again and again to snap back into a straight course. Belt band 2 is driven via a linear motor drive system 4 that is arranged and works laterally with respect to belt band 2. This linear motor drive system 4, 4', 4" consists of a plurality of stators and magnets and the stators are associated with supporting frame 3, while the magnets are associated with belt band 2.

Supporting frame 3 consists of two perpendicular supports 6' and horizontal strut 7, with longitudinal strut 8 being formed of guide ducts 10 and 11. These guide ducts 10 simultaneously served guide belt band 2, which will be explained in greater detail below. Here, there is an upper and a lower guide duct 10 and 11, because belt band 2 is guided back around the deflection rollers, not shown here, so that one gets an endless belt band 2.

FIG. 2 is a head-on view or a section through curved conveyor belt 1, clearly showing that guide ducts 10, 10' and 11, 11', together with perpendicular support 6, 6' and horizontal strut 7 form the stable supporting frame 3. This supporting frame 3 also carries stator 12 that are arranged on the reverse side 13 of guide ducts 10, 11, as shown in FIG. 2.

On the opposite side of stator 12, guide ducts 10, 11 reveal a longitudinally passing recess 14 through which running wheel carrier 15 grasps with carrying bar 16 and wheels 25, 26. Wheels 25, 26 are so arranged and guided that they can roll off uniformly on or in guide ducts 10, 11—as shown particularly clearly in FIG. 4—if they must go into operation on account of corresponding loading, or if linear motor drive system 4 has broken down.

The free end 17 of running wheel carrier 15 is connected with side edges 18, 19 of belt band 2, specifically, as will be explained below, it is connected in such an articulated fashion that there cannot be any overloading of side edges 18, 19. Both upper belt 20 and lower belt 21 are, in this way, on the one hand, made taut and, on the other hand, they are troughed, as shown in FIG. 2 and FIG. 3. This makes it possible, in the trough of upper belt 20, to transport a corresponding quantity of material and, simultaneously, to arrange lower belt 21 at a close interval thereunder, which facilitates the favorable structural height that can be seen in FIG. 2.

As mentioned earlier, drive is applied via the linear motor drive system 4 with stator 12 and magnet 23, while magnet 23 is integrated upon or in crossbars 22 of carrying spar 16, or is fixed thereupon. In this way, one can always ensure the same interval between stator 12 and magnet 23.

FIG. 3 shows the connection between running wheel carrier 15 or supporting bar 16 and side wheels 18, 19 of belt band 2. Also shown is the shape and arrangement of wheels 25, 26 which are associated with a cart 27 that ensures the uniform roll-off on the running surface 34 of flanges 35, 36.

To be able to run through corresponding curves, as shown in FIG. 1, duct sections 29, 30 are provided, and they are associated with correspondingly fashioned supporting frames 31, 32. This offers a possibility of running through a corresponding curve, although, of course, it is also possible to make the guide ducts 10, 11 arc-shaped in order thus to ensure uniform and continual guidance of belt band 2 also around curves.

Figure 4:
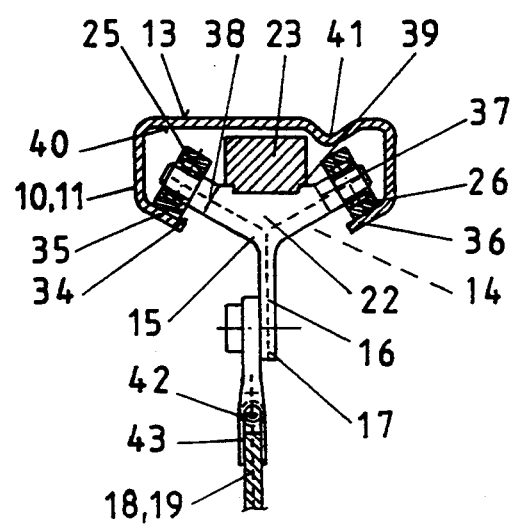
FIG. 4 is a cross-section through a guide duct.
Figure 5:
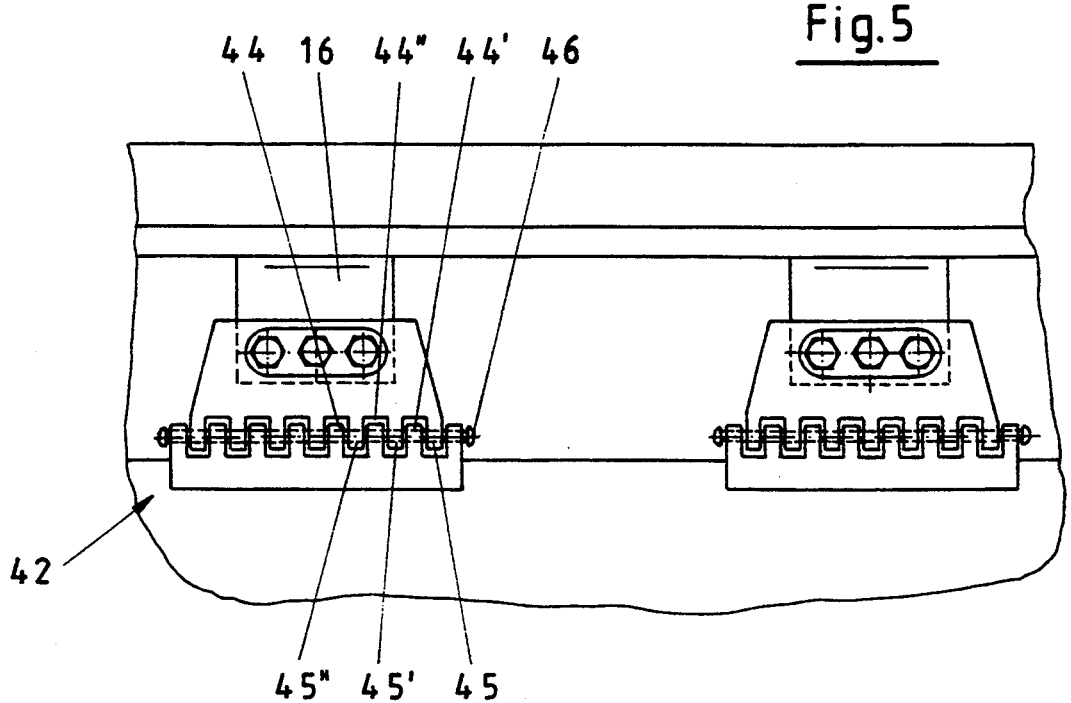
FIG. 5 shows the articulated connection between the running wheel carriers and the belt band.

FIG. 4 is a section through one of the guide ducts 10 or 11 and a head-on view of one of the carts 27 or the running wheel carriers 15. This running wheel carrier 15, as shown in FIG. 4, consists of two sections 37, 38 that are arranged and set up at an angle with respect to each other and that together form crossbar 22. This angular arrangement creates a favorable possibility for the arrangement of a mounting 39 on crossbar 22 for magnet 23.

To secure running wheel carrier 15 in guide duct 10 or 11, a groove 41 that projects on the reverse side 13 toward inside 40 is so fashioned that, in case of doubt, the associated wheel can be braced thereon in case it becomes wedged, without the danger that magnet 23 might come into contact with reverse side 13. In that way, one can prevent the magnet 23 from being damaged or abraded.

Earlier, in connection with FIG. 2 and FIG. 3, it was pointed out that an articulated connection 42 is provided to prevent overloading belt band 2 in the area of the connection with running wheel carriers 15. This articulated connection 42 has a clamping device 43 that is clamped upon side edges 18, 19 of belt band 2 and that reveals teeth 44 that are made to correspond with teeth 45 of free end 17 of carrying spar 16 so that one gets the desired articulated connection 42 after a swing access 46 has been pushed through. In that way, there can be no damage in the marginal area or on side edge 18, 19, even if belt band 2 is correspondingly loaded.

Figure 6:
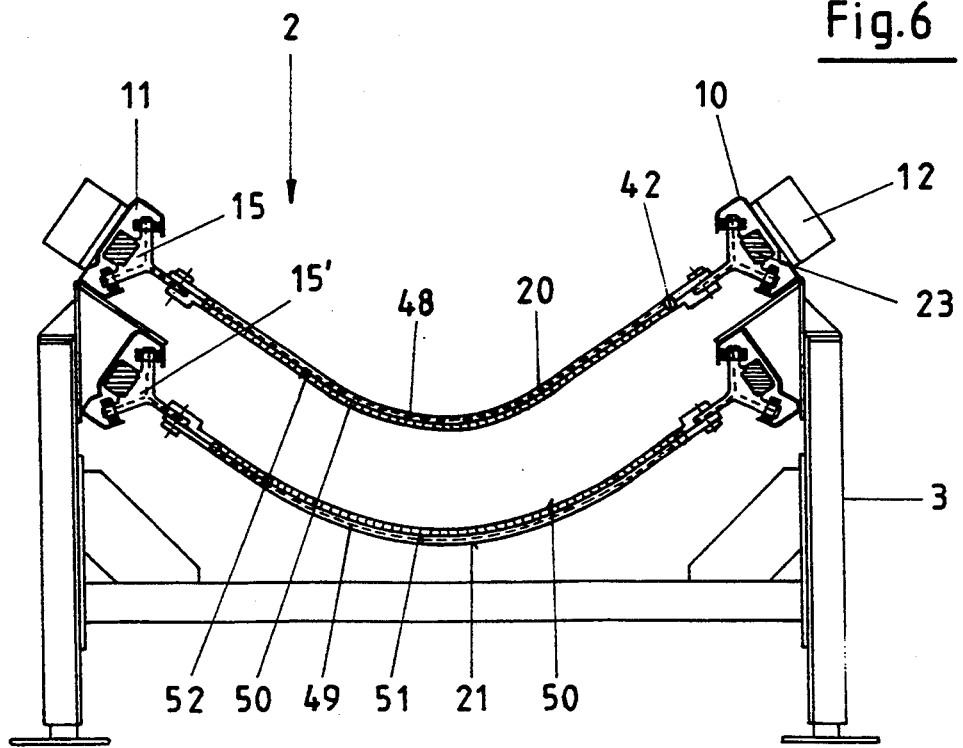
FIG. 6 shows one version of the belt band with connecting belts between the bilaterally arranged running wheel carriers.

FIG. 6 and FIG. 2 show that belt band 2 is equipped with lateral reinforcements 48, 49, specifically, in the area of running wheel carriers 15 or carrying spars 16. Additionally, it should also be mentioned that the connection between running wheel carrier 16 and side edge 18 or 19 is accomplished in each case via a corresponding width or length so that there cannot be any point-shaped loading due to clamping and transmission of forces.

According to FIG. 2, lateral reinforcements 48, 49 are integrated into belt band 2, whereas, according to FIG. 6, connecting belts 50 are provided and they are applied upon belt band 2 from the outside, preferably, they are glued on. In the version shown in FIG. 6, one can see that, in the case of upper belt 20, this particular connecting belt 50—which after all runs in the lateral direction—is arranged on the underside 52, whereas, in the case of lower belt 21, it runs on the top side 51, so that, during a transport run, it will not represent any obstacle to the material being moved, whereas, during the cleaning of the lower belt, the underside again remains free, so that one can perform a perfect and possibly necessary cleaning procedure.

The version according to FIG. 6 offers the advantage that retro-fitting of belt bands 2 may be possible, while the integrated arrangement offers the possibility of using the belt band 2 as desired in the particular case, without having to watch out and make sure that the particular top side of upper belt 20 must remain free and clear so as to prevent any possible trouble during the conveyance of bulk goods. On the other hand, depending on the inclination of the curved conveyor belt, it may, under certain circumstances, also be possible—by virtue of connecting belts 50—to overcome certain upgrades along the section without any problem.

Figure 7:
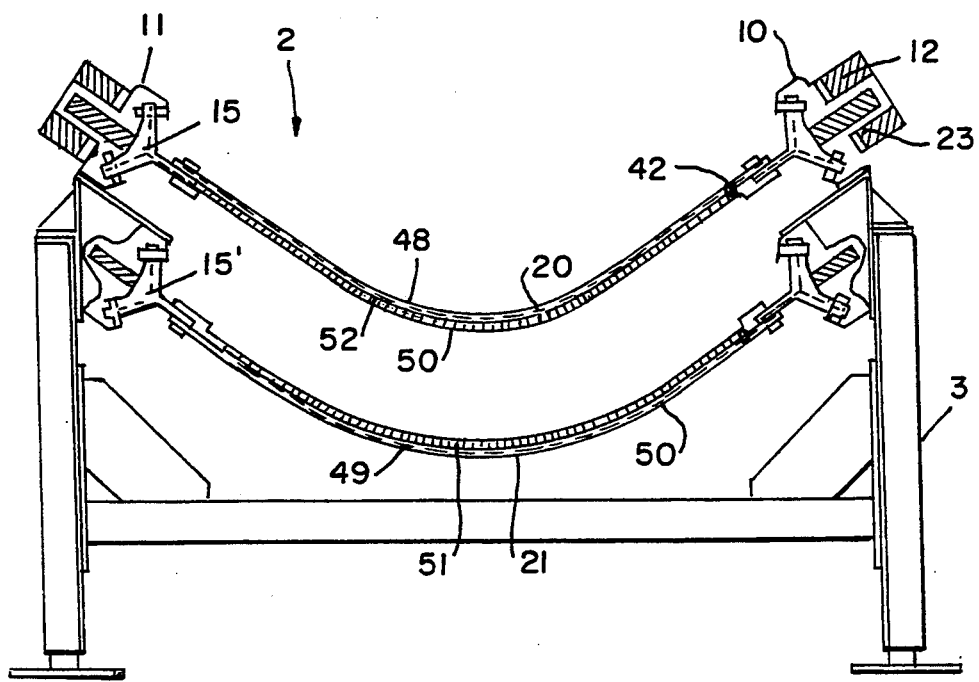
FIG. 7 shows the design according to FIG. 6, only this time with magnets extending between the stators.
Figure 7:
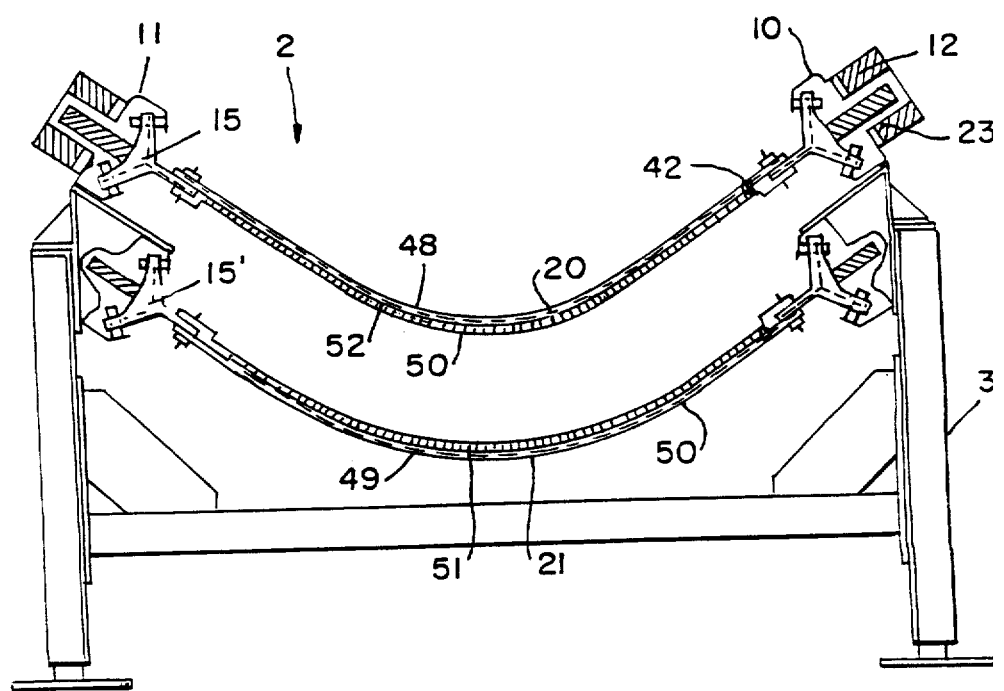

FIG. 7 shows a version of the drive system according to FIG. 6 with magnets 23 standing upright on the narrow side, said magnets being guided between both stators or stator halves, so that one gets large contact surfaces, which is advantageous for the transmission of the necessary drive systems. In the example illustrated, lower belt 21 is not driven separately; therefore, the housing of guide duct 10, 11 must be altered somewhat to provide the necessary protection for the edgewise standing magnet 23.

The figure does not illustrate the version where the lateral stators and magnets are replaced by a different drive system, for example, a traction chain. This traction chain likewise runs in guide ducts 10, 11 from the upper belt to the lower belt, and the other parts, especially running wheel carriers 15, can be retained, the only difference being that, instead of the magnet, a connection with a circulating traction chain is provided.

All of the features mentioned, including those to be gathered from the drawings alone, are considered to be essential to the invention by themselves and in combination.

We claim:

1. A conveyor belt apparatus comprising a belt band having upper and lower belts guided on supporting frames and around deflection rollers, the belt band being driven by a linear motor drive system arranged along the belt band, plural upper and lower guide ducts running bilaterally in a longitudinal direction, each guide duct having an inner and an outer side, said outer side facing away from the belt band, plural stators arranged at intervals on the outer sides of each upper guide duct, a recess formed in the longitudinal direction along the inner side of each guide duct, plural guide devices within each recess abutting each guide duct, a carrying spar extending from each guide device for connecting with first and second side edges of the upper belt and the lower belt respectively, and plural magnets supported by the carrying spars for interaction with the stators.

2. The apparatus of claim 1, further comprising each guide device having a T-shaped carrier having plural sets of wheels on first and second ends of each carrier abutting plural flanges formed by each guide duct and a third end of each carrier forming the carrying spar, and a crossbar connecting each of the first and second ends of the carrier shaped to receive the magnets.

3. The apparatus of claim 2, further comprising the belt band having lateral reinforcements along each belt.

4. The apparatus of claim 3, wherein the lateral reinforcements are integrated into the belt band at plural intervals, each of said intervals corresponding to an interval between adjacent carrying spars.

5. The apparatus of claim 3, wherein the lateral reinforcements are made as connecting belts between the carriers, and are connected with an underside of the upper belt and a top side of the lower belt.

6. The apparatus of claim 1, wherein each supporting frame is formed generally of H-shaped members with the guide ducts running along an upper end of each perpendicular support member.

7. The apparatus of claim 6, wherein each guide duct is at an angle with respect to the supporting frames.

8. The apparatus of claim 1, wherein each carrying spar is obliquely positioned with respect to the supporting frames and each guide duct is at right angles to the belt band.

9. The apparatus of claim 2, wherein each flange of the guide ducts serve as running surfaces for the wheels of each carrier and wherein the crossbars and the flanges are positioned obliquely with respect to the supporting frames.

10. The apparatus of claim 1, wherein each guide duct is shaped to create a curved duct with a curve having any of plural curve radii as required.

11. The apparatus of claim 1, wherein the guide ducts comprise short interconnectable duct pieces for forming a predetermined curve.

12. The apparatus of claim 2, wherein each crossbar comprises first and second sections forming a V-shaped section and forming a shaped section along a middle portion for mounting each magnet.

13. The apparatus of claim 1, wherein the plural stators arranged at intervals on the outer sides of each upper guide duct include pairs of stators transversely spaced across the upper guide duct, and each magnet is positioned standing edgewise on a narrow side and extending between the transversely spaced stators.

14. The apparatus of claim 2, wherein the inner side of each guide duct has at least one groove protruding inwardly into the recess and located above at least one set of the wheels.

15. The apparatus of claim 1, wherein each carrying spar has an articulated connection with the side edges of the belts.

16. The apparatus of claim 15, wherein the articulated connection is a clamp.

17. The apparatus of claim 16, wherein the clamp and the carrying spar each have complementary teeth for engaging each other hingedly, and further comprising a swing access running laterally through the connected teeth and parallel to the side edges of the belts.

* * * * *

UNITED STATES PATENT AND TRADEMARK OFFICE
CERTIFICATE OF CORRECTION

PATENT NO. : 5,398,804

DATED : March 21, 1995

INVENTOR(S) : Robert Ecker, Johannes Lintermann, Friedhelm Buderath

It is certified that error appears in the above-identified patent and that said Letters Patent is hereby corrected as shown below:

In the Drawings:

Replace Figure 7 with the attached correct   formal drawing.

Signed and Sealed this

Twenty-sixth Day of December, 1995

Attest:

BRUCE LEHMAN

*Attesting Officer*    *Commissioner of Patents and Trademarks*